United States Patent
Yasutomi (10) Patent No.: US 12,114,070 B2
(45) Date of Patent: Oct. 8, 2024

(54) IMAGE PICKUP APPARATUS, IMAGE PICKUP METHOD, AND NON-TRANSITORY COMPUTER-READABLE STORAGE MEDIUM FOR CORRECTING INFLUENCE CAUSED BY AN EFFECTIVE F-NUMBER

(71) Applicant: CANON KABUSHIKI KAISHA, Tokyo (JP)

(72) Inventor: Takeshi Yasutomi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/866,338

(22) Filed: Jul. 15, 2022

(65) Prior Publication Data

US 2022/0360708 A1 Nov. 10, 2022

Related U.S. Application Data

(63) Continuation of application No. 16/716,307, filed on Dec. 16, 2019, now Pat. No. 11,425,302.

(30) Foreign Application Priority Data

Dec. 26, 2018 (JP) .................................. 2018-242852

(51) Int. Cl.
| | |
|---|---|
| H04N 23/67 | (2023.01) |
| G06T 5/50 | (2006.01) |
| H04N 23/63 | (2023.01) |
| H04N 23/73 | (2023.01) |
| H04N 23/743 | (2023.01) |
| H04N 23/951 | (2023.01) |

(52) U.S. Cl.
CPC ............ *H04N 23/676* (2023.01); *G06T 5/50* (2013.01); *H04N 23/63* (2023.01); *H04N 23/73* (2023.01); *H04N 23/743* (2023.01); *H04N 23/951* (2023.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2002/0154240 | A1* | 10/2002 | Tamai | H04N 23/673 |
| | | | | 348/E5.045 |
| 2010/0079617 | A1* | 4/2010 | Kosaka | H04N 23/76 |
| | | | | 348/229.1 |
| 2018/0241949 | A1* | 8/2018 | Kawai | H04N 23/685 |

FOREIGN PATENT DOCUMENTS

WO WO-2011025526 A1 * 3/2011 ........... H04N 5/2351

OTHER PUBLICATIONS

"EOS R8: Focus Bracketing", 2023, "https://www.usa.canon.com", Article ID: ART182341 (Year: 2023).*

(Continued)

*Primary Examiner* — Quan Pham
(74) *Attorney, Agent, or Firm* — Canon U.S.A., Inc. IP Division (57) ABSTRACT

An image pickup apparatus includes a sensor configured to pick up a plurality of images different in in-focus position in an optical axis direction, an adjustment unit configured to adjust a parameter relating to image pickup to correct influence caused by an effective F-number varied depending on an in-focus position when at least a part of the plurality of images is picked up, and a synthesis unit configured to synthesize the plurality of images.

15 Claims, 7 Drawing Sheets

(56) References Cited

OTHER PUBLICATIONS

"How to I adjust magnification and effective f-number", 2016, "https://www.usa.canon.com", Article ID: ART151965 (Year: 2016).*
Jiachun Shen; "On the Influence of Aperture Tracking Control on the Quality of TV Program Recording;" Advanced Television Engineering; Dec. 15, 2012; pp. 1-12.

* cited by examiner

IMAGE PICKUP APPARATUS, IMAGE PICKUP METHOD, AND NON-TRANSITORY COMPUTER-READABLE STORAGE MEDIUM FOR CORRECTING INFLUENCE CAUSED BY AN EFFECTIVE F-NUMBER

CROSS-REFERENCE TO RELATED APPLICATION

This application is a Continuation of U.S. application Ser. No. 16/716,307, filed Dec. 16, 2019, which claims priority from Japanese Patent Application No. 2018-242852, filed Dec. 26, 2018, which are hereby incorporated by reference herein in their entireties.

BACKGROUND OF THE INVENTION

Field of the Invention

The aspect of the embodiments relates to an image pickup apparatus that aligns a plurality of images.

Description of the Related Art

In a case where images of a plurality of objects that is largely different in distance from an image pickup apparatus such as a digital camera are picked up or in a case where an image of an object long in a depth direction is picked up, only a part of the object may be focused because of insufficient depth of field. To solve such an issue, Japanese Patent Application Laid-Open No. H10-290389 discusses a so-called focus stacking technique in which a plurality of images different in in-focus position is picked up, only a focused area is extracted from each of the images, and the focused areas are synthesized to generate one synthesized image focused on the entire image pickup area. Japanese Patent Application Laid-Open No. 2014-207502 discusses a technique in which a user designates objects to be focused through a touch panel, and picks up a focus-stacked image focused on each of the objects to be focused.

However, when an image is picked up by the methods discussed in Japanese Patent Application Laid-Open No. H10-290389 and Japanese Patent Application Laid-Open No. 2014-207502, the following issues may occur due to influence of an effective F-number of a lens.

In the image pickup for focus stacking, the images are picked up while the in-focus position is changed. The effective F-number is varied depending on the in-focus position. Variation of the effective F-number may change brightness and the depth of the picked-up image, which may cause nonuniformity of the synthesized image.

SUMMARY OF THE INVENTION

According to an aspect of the embodiments, an apparatus includes a sensor configured to pick up a plurality of images different in in-focus position in an optical axis direction, an adjustment unit configured to adjust a parameter relating to image pickup to correct influence caused by an effective F-number varied depending on an in-focus position when at least a part of the plurality of images is picked up, and a synthesis unit configured to synthesize the plurality of images.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings.

Figure 1:
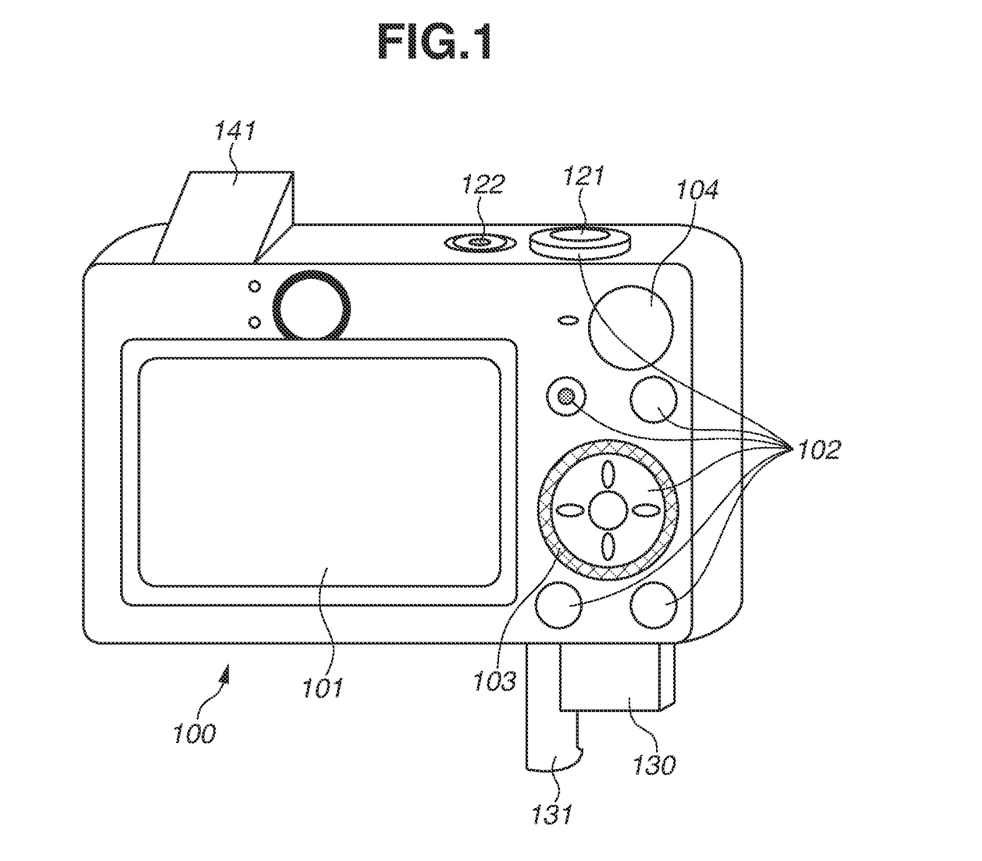
FIG. 1 is a rear perspective view illustrating a schematic configuration of a digital camera according to an exemplary embodiment of the disclosure.

FIG. 1 is a rear perspective view illustrating a schematic configuration of a digital camera as an image pickup apparatus according to an exemplary embodiment.

A display unit 101 for displaying an image and various kinds of information, and an operation unit 102 that includes operation members such as various switches and buttons for receiving various kinds of operations by a user, are provided on a rear surface of a digital camera 100. Further, a mode selection switch 104 for switching an image pickup mode, and a controller wheel 103 that is rotationally operable are provided on the rear surface of the digital camera 100. A shutter button 121 for issuing an image pickup instruction, a power switch 122 for switching on/off of power supply of the digital camera 100, and a flash 141 for emitting flashlight to an object are provided on a top surface of the digital camera 100. The flash 141 emits light in synchronization with the image pickup instruction, to make up for deficiency of a light amount in a dark object field. The display unit 101 may include a touch panel, and a part or all of functions by the operation unit 102, the controller wheel 103, the mode selection switch 104, and the shutter button 121 may be achieved by a touch operation of the user on the display unit 101.

The digital camera 100 is connectable to an external apparatus through a wired or wireless communication, and can output image data (still image data and moving image data) to the external apparatus. A recording medium slot (not illustrated) openable/closable by a lid 131 is provided on a bottom surface of the digital camera 100, and a recording medium 130 such as a memory card is insertable to and removable from the recording medium slot.

The recording medium 130 stored in the recording medium slot can communicate with a system control unit 210 (see FIG. 2) of the digital camera 100. The recording medium 130 is not limited to the memory card that is insertable to and removable from the recording medium slot, and may be an optical disk or a magnetic disk such as a hard disk. Further, the recording medium 130 may be built in a main body of the digital camera 100.

Figure 2:
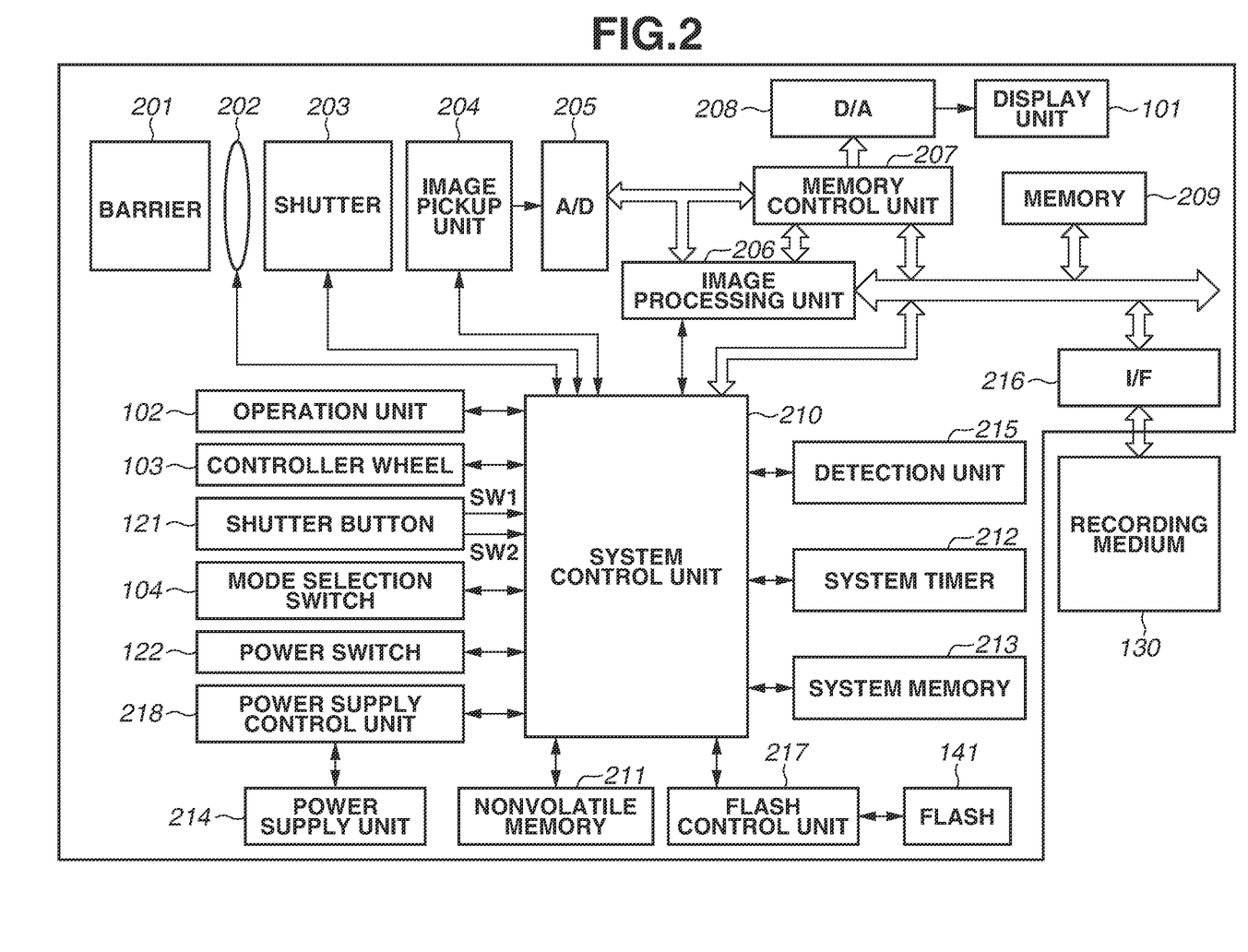
FIG. 2 is a block diagram illustrating a hardware configuration of the digital camera according to the exemplary embodiment of the disclosure.

FIG. 2 is a block diagram illustrating a hardware configuration of the digital camera 100. The digital camera 100 includes a barrier 201, an image pickup lens 202, a shutter 203, and an image pickup unit 204. The barrier 201 covers an image pickup optical system to prevent dirt and breakage of the image pickup optical system. The image pickup lens 202 includes a lens group including a zoom lens and a focus lens, and configures the image pickup optical system. The shutter 203 includes an aperture function to adjust an exposure amount for the image pickup unit 204. The image pickup unit 204 is an image pickup device that converts an optical image into an electric signal (analog signal), and is, for example, an image sensor including a Bayer array structure in which RGB pixels are regularly arranged, such as a charge-coupled device (CCD) sensor and a complementally metal-oxide semiconductor (CMOS) sensor. The shutter 203 may be a mechanical shutter or an electronic shutter that controls an accumulation time by controlling reset timing of the image pickup device.

Alternatively, the image pickup unit 204 has a structure in which a plurality of photoelectric conversion units is provided in one pixel to acquire a stereo image, and can perform autofocus (AF) processing by phase difference detection.

Figure 3:
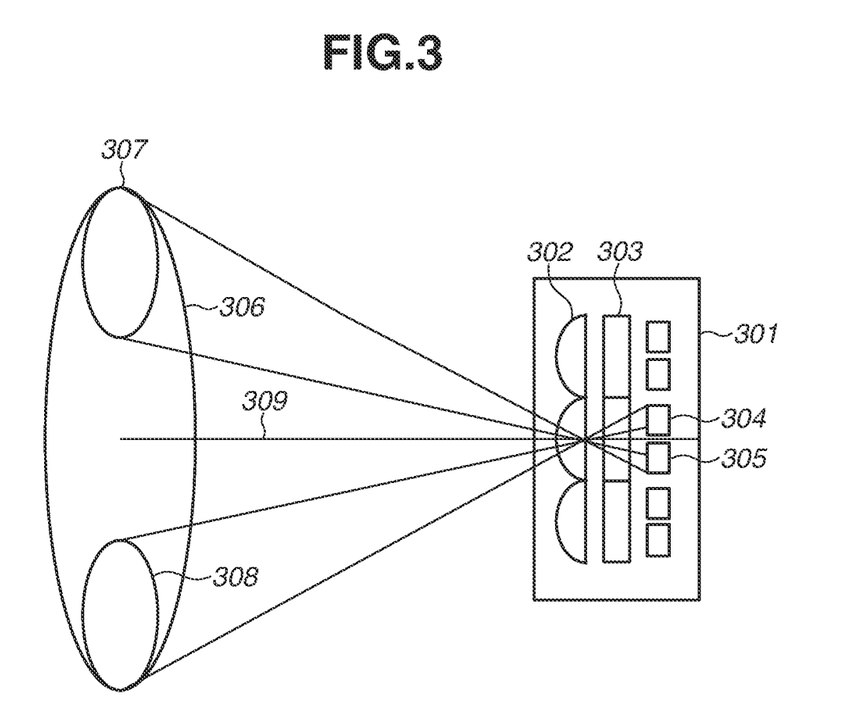
FIG. 3 is a diagram illustrating a state where an optical signal enters a pixel that includes a plurality of photoelectric conversion units according to the exemplary embodiment of the disclosure.

FIG. 3 is a diagram illustrating a state where an optical signal enters a pixel that includes a plurality of photoelectric conversion units according to the present exemplary embodiment.

In FIG. 3, a pixel array 301 includes a micro lens 302, a color filter 303, and photoelectric conversion units 304 and 305 for each pixel. The photoelectric conversion units 304 and 305 belong to the same pixel, and correspond to one common micro lens 302 and one common color filter 303. FIG. 3 is a diagram illustrating the digital camera 100 viewed from above, and illustrates a state where the two photoelectric conversion units 304 and 305 corresponding to one pixel are arranged side by side. Among light beams exited from an exit pupil 306, light beams on an upper side of an optical axis 309 (corresponding to light beams from area 307) enter the photoelectric conversion unit 305, and light beams on a lower side (corresponding to light beams from area 308) enter the photoelectric conversion unit 304. In other words, the photoelectric conversion units 304 and 305 each receive light of the different areas of the exit pupil of the image pickup lens. When a signal image of the light received by the photoelectric conversion unit 304 is denoted by an image A and a signal image of the light received by the photoelectric conversion unit 305 is denoted by an image B, a defocusing amount can be calculated based on a phase difference between paired pupil-divided images like the image A and the image B, and distance information can be acquired. In particular, when pixels each including the two photoelectric conversion units are disposed over the entire surface of the image pickup device, the image pickup device can acquire the distance information on an object at an optional position on a screen.

The above-described distance information can be obtained by not using the image pickup device that includes the pixels each including the two photoelectric conversion units but by using an image pickup device that includes normal pixels. For example, the image pickup unit 204 generates a plurality of images different in position to be focused by changing relative positions of the plurality of lenses. An image processing unit 206 described below divides each of the images into blocks, and calculates contrast of each of the blocks. The image processing unit 206 compares contrast between the blocks at the same position of the plurality of picked-up images, and determines a block having the largest contrast as an in-focus block. Finally, the image processing unit 206 determines the distance information on each of the blocks from the in-focus position of the captured image.

The digital camera 100 includes an analog-to-digital (A/D) converter 205, the image processing unit 206, a memory control unit 207, a digital-to-analog (D/A) converter 208, a memory 209, and a system control unit 210. An analog signal is output from the image pickup unit 204 to the A/D converter 205. The A/D converter 205 converts the acquired analog signal into image data of a digital signal, and outputs the image data to the image processing unit 206 or the memory control unit 207.

The image processing unit 206 performs correction processing such as pixel interpolation and shading correction, white balance processing, gamma correction processing, color conversion processing on the image data acquired from the A/D converter 205 or the data acquired from the memory control unit 207. Further, the image processing unit 206 extracts an image and performs variable magnification processing, thereby achieving an electronic zoom function. Further, the image processing unit 206 performs predetermined calculation processing using the image data of the picked-up image, and the system control unit 210 performs exposure control and ranging control based on a result acquired in this way by the calculation processing. For example, the system control unit 210 performs autofocus (AF) processing, automatic exposure (AE) processing, and flash pre-emission (hereinafter, referred to as EF) processing based on through-the-lens (TTL) system. The image processing unit 206 performs the predetermined calculation processing using the image data of the picked-up image, and the system control unit 210 performs automatic white balance (AWB) processing of the TTL system with use of the acquired calculation result.

The image processing unit 206 includes an image synthesis processing circuit. In place of the configuration including the image processing unit 206, a configuration in which the function of the image synthesis processing is achieved by software processing by the system control unit 210 may be employed.

More specifically, the image processing unit 206 can perform, as the synthesis processing, addition synthesis processing, weighted addition synthesis processing, or the like. A pixel value of each of the images before synthesis is denoted by $I\_i(x, y)$ (i=1 to N, and x and y represent coordinate in a screen), and a pixel value of an image obtained by synthesizing the N images is denoted by $I(x, y)$. The pixel value may be a value of each of signals R, G1, G2, and B of a Bayer array output after the AWB processing is performed, or may be a value (luminance value) of a luminance signal obtained from a group of the signals R, G1, G2, and B. At this time, the luminance value may be calculated for each pixel after interpolation processing is performed on the signals of the Bayer array in such a manner that each of the pixels includes the signals R, G, and B. The luminance value is calculated by, for example, the following expression (1), $$Y = 0.3 \times R + 0.59 \times G + 0.11 \times B. \quad (1)$$

The processing is performed based on the following expression for each of the pixel values associated by, for example, alignment processing on the plurality of images as necessary. The addition synthesis processing is performed by the following expression (2), $$I(x,y) = (x,y) + I\_2(x,y) + \ldots + I\_N(x,y). \quad (2)$$

The weighted addition synthesis processing is performed by the following expression (3), $$I(x,y)=(a1 \times I\_1(x,y)+a2 \times I\_2(x,y)+ \ldots +aN \times I\_N(x,y))/N, \quad (3)$$

where ak is a weighting coefficient.

The image data output from the A/D converter 205 is written into the memory 209 through the image processing unit 206 and the memory control unit 207, or through the memory control unit 207. The memory 209 also serves as an image display memory (video memory) storing the image data to be displayed on the display unit 101. The memory 209 has a storage capacity that can store a predetermined number of still images, a predetermined number of panoramic images (wide-angle images), and a synthesized result of the panoramic images. The memory 209 can also be used as a work area where the system control unit 210 loads a program read from a nonvolatile memory 211.

The image display data (digital data) stored in the memory 209 is transmitted to the D/A converter 208. The D/A converter 208 converts the received digital data into an analog signal, and supplies the analog signal to the display unit 101. As a result, an image is displayed on the display unit 101. The display unit 101 is a display device such as a liquid crystal display and an organic electroluminescence (EL) display, and displays the image based on the analog signal from the D/A converter 208. ON/OFF of image display on the display unit 101 is switched by the system control unit 210. Turning off the image display can reduce power consumption. When the digital signal accumulated in the memory 209 from the image pickup unit 204 through the A/D converter 205 is converted into the analog signal by the D/A converter 208 and an image of the analog signal is sequentially displayed on the display unit 101, an electronic viewfinder function displaying a live image can be achieved.

The digital camera 100 includes the nonvolatile memory 211, a system timer 212, a system memory 213, a detection unit 215, and a flash control unit 217. The nonvolatile memory 211 is an electrically-erasable/storable memory (e.g., electrically erasable programable read-only memory (EEPROM)), and stores programs to be executed by the system control unit 210, operation constants, and the like. The programs used here are programs to execute various kinds of flowcharts according to the present exemplary embodiment described below. Further, the nonvolatile memory 211 includes an area storing system information and an area storing user setting information. The system control unit 210 reads out and restores various information and settings stored in the nonvolatile memory 211, at startup of the digital camera 100.

The system control unit 210 includes a central processing unit (CPU), and executes various kinds of program codes stored in the nonvolatile memory 211 to control the entire operation of the digital camera 100. The programs, the operation constants, variables, and the like read by the system control unit 210 from the nonvolatile memory 211 are loaded into the system memory 213. A random access memory (RAM) is used as the system memory 213. Further, the system control unit 210 controls the memory 209, the D/A converter 208, the display unit 101, and the like to perform display control. The system timer 212 measures time used for various control and time of a built-in clock. The flash control unit 217 controls light emission of the flash 141 based on brightness of the object. The detection unit 215 includes a gyro or an accelerator sensor, and acquires angular velocity information, attitude information, and the like of the digital camera 100. The angular velocity information includes information on an angular velocity and an angular acceleration in panoramic image pickup by the digital camera 100. The attitude information includes information on inclination of the digital camera 100 with respect to a horizontal direction.

The display unit 101, the operation unit 102, the controller wheel 103, the shutter button 121, the mode selection switch 104, the power switch 122, and the flash 141 illustrated in FIG. 2 are the same as those described with reference to FIG. 1.

The various kinds of operation members configuring the operation unit 102 are used for, for example, selection of various function icons displayed on the display unit 101. When a predetermined function icon is selected, a function is assigned to the operation members for each scene. In other words, the operation members of the operation unit 102 act as various kinds of function buttons. Examples of the function buttons include an end button, a back button, an image feeding button, a jump button, a depth-of-field preview button, an attribute change button, and a DISP button. For example, when a menu button is pressed, a menu screen for various kinds of setting is displayed on the display unit 101. The user can intuitively perform setting operation with use of the menu screen displayed on the display unit 101, four-direction buttons, and a SET button.

The controller wheel 103 that is an operation member rotationally operated is used to designate a selection item, together with the four-direction buttons. When the controller wheel 103 is rotationally operated, an electric pulse signal corresponding to an operated amount (e.g., rotation angle and number of rotation) is generated. The system control unit 210 analyzes the pulse signal and controls each of the units in the digital camera 100. The controller wheel 103 may be any member that can detect a rotation operation. For example, the controller wheel 103 may be a dial operation member that generates a pulse signal corresponding to a rotation operation by the user. Further, the controller wheel 103 may be an operation member including a touch sensor that detects a rotation operation by a finger of the user on the controller wheel 103 (so-called touch wheel).

The shutter button 121 includes a first switch SW1 and a second switch SW2. The first switch SW1 is turned on when the shutter button 121 is half-pressed in the middle of the operation. As a result, a signal to instruct preparation of image pickup is transmitted to the system control unit 210. Upon receiving the signal indicating turning-on of the first switch SW1, the system control unit 210 starts operations of the AF processing, the AE processing, the AWB processing, the EF processing, and other processing. The second switch SW2 is turned on when the shutter button 121 is fully pressed at completion of the operation. As a result, a signal to instruct start of the image pickup is transmitted to the system control unit 210. Upon receiving the signal indicating turning-on of the second switch SW2, the system control unit 210 performs a series of image pickup operations from reading out of the signal from the image pickup unit 204 to writing of the image data in the recording medium 130.

The mode selection switch 104 switches an operation mode of the digital camera 100 between various kinds of modes such as a still image pickup mode, a moving image pickup mode, and a playback mode. Each of the still image pickup mode and the moving image pickup mode further includes an automatic image pickup mode, an automatic scene determination mode, a manual mode, various scene modes with image pickup setting for respective scenes, a program AE mode, and a custom mode. The still image pickup mode further includes a panoramic image pickup mode in which a panoramic image is synthesized through panoramic image pickup (wide-angle image synthesis).

The digital camera 100 includes a power supply unit 214 and a power supply control unit 218. The power supply unit 214 is, for example, a primary battery such as an alkaline battery and a lithium (Li) battery, a secondary battery such as a nickel-cadmium (NiCd) battery, a nickel-metal hydride (NiMH) battery, and a Li battery, or an alternating-current (AC) adapter, and supplies power to the power supply control unit 218. The power supply control unit 218 detects attachment/unattachment of the battery, a type of the battery, a remaining battery level, and the like of the power supply unit 214, and supplies a voltage to the units including the recording medium 130 during a time period based on a result of the detection and an instruction by the system control unit 210.

The digital camera 100 includes an interface (I/F) 216 that enables communication between the recording medium 130 and the system control unit 210 when the recording medium 130 is mounted in the recording medium slot (not illustrated). The detail of the recording medium 130 has been already described with reference to FIG. 1, and description is omitted here.

Next, focus stacking (focus bracket) is briefly described.

FIGS. 4A to 4D are diagrams illustrating a state where an object image is formed on an imaging plane according to the present exemplary embodiment.

Figures 4A, 4B:
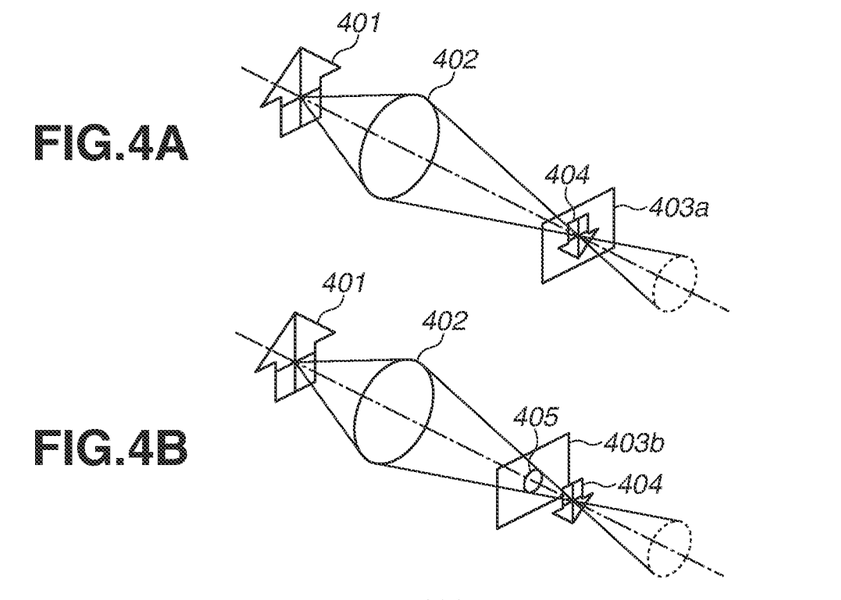
FIGS. 4A to 4D are diagrams illustrating a state where an object image is formed on an imaging plane according to the exemplary embodiment of the disclosure.

FIG. 4A illustrates a state where an image 404 of an object 401 is formed on a plane 403a by an optical lens 402. When the plane 403a and an image sensor plane of the image pickup device are coincident with each other, an image of the object 401 is formed as a "point" on the plane 403a, and is recorded as a focused image.

FIG. 4B illustrates a case where the imaging plane and the image sensor plane are not coincident with each other. In a case where an image sensor plane 403b is located at a position different from the plane 403a illustrated in FIG. 4A, an image of the object 401 formed by the optical lens 402 looks as a circle of confusion 405 on the image sensor plane 403b. At this time, in a case where the circle of confusion 405 is smaller than a permissible circle of confusion of the image pickup device, the circle of confusion 405 is regarded as equivalent to the focused "point", and an image equivalent to the focused image can be obtained. On the other hand, in a case where the circle of confusion 405 is larger than the permissible circle of confusion, a blurred image is obtained on the image sensor plane 403b.

Figure 4C:
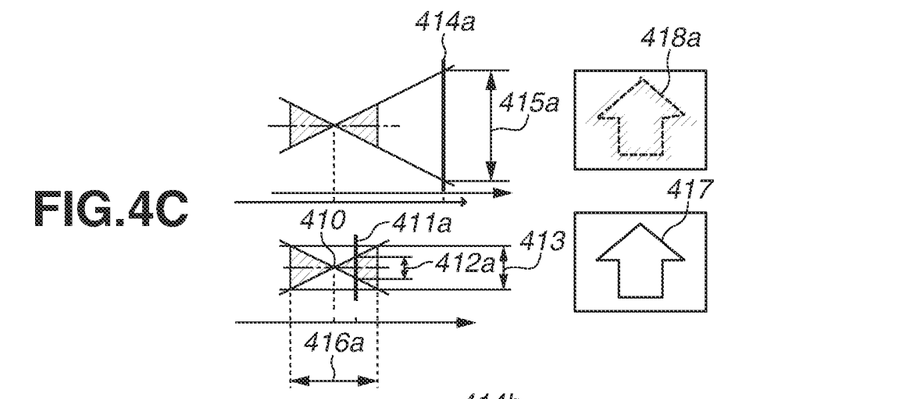

FIG. 4C is a diagram illustrating the above-described state viewed from a side. In the case where the image of the object is formed on a focal point 410 and an image sensor plane is present at a position of a plane 411a, a diameter 412a of a circle of confusion is obtained. The diameter 412a of the circle of confusion at this time is smaller than a diameter 413 of the permissible circle of confusion of the image pickup device. Accordingly, an image 417 recorded by the image pickup device is a focused image without blurring. On the other hand, in a case where the image sensor plane is present at a position of a plane 414a, a diameter 415a of a circle of confusion at this time is larger than the diameter 413 of the permissible circle of confusion. Accordingly, an image 418a on the image sensor plane 414a is a blurred image. A hatched area where the diameter 412a of the circle of confusion is smaller than the diameter 413 of the permissible circle of confusion corresponds to the depth of focus 416a, and the depth of focus 416a is converted and replaced on the object side as the depth of field.

Figure 4D:
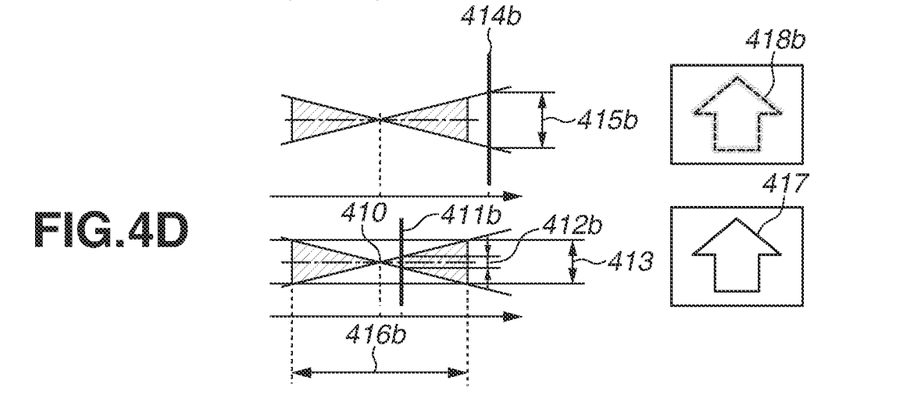

FIG. 4D is a diagram illustrating a state where an aperture is more closed than that in the state illustrated in FIG. 4C. In the state where the aperture is further closed, the diameters 412a and 415a of the circle of confusion in FIG. 4C are respectively changed to a diameter 412b of the circle of confusion to the plane 411b and a diameter 415b of the circle of confusion to a plane 414b. At this time, the diameter 415b of the circle of confusion in FIG. 4D is smaller than the diameter 415a of the circle of confusion in FIG. 4C. Therefore, an image 418b obtained at this time is an image with less blurring as compared with the image 418a. Further, a depth of focus 416b at this time is deeper than the depth of focus 416a.

Figure 5:
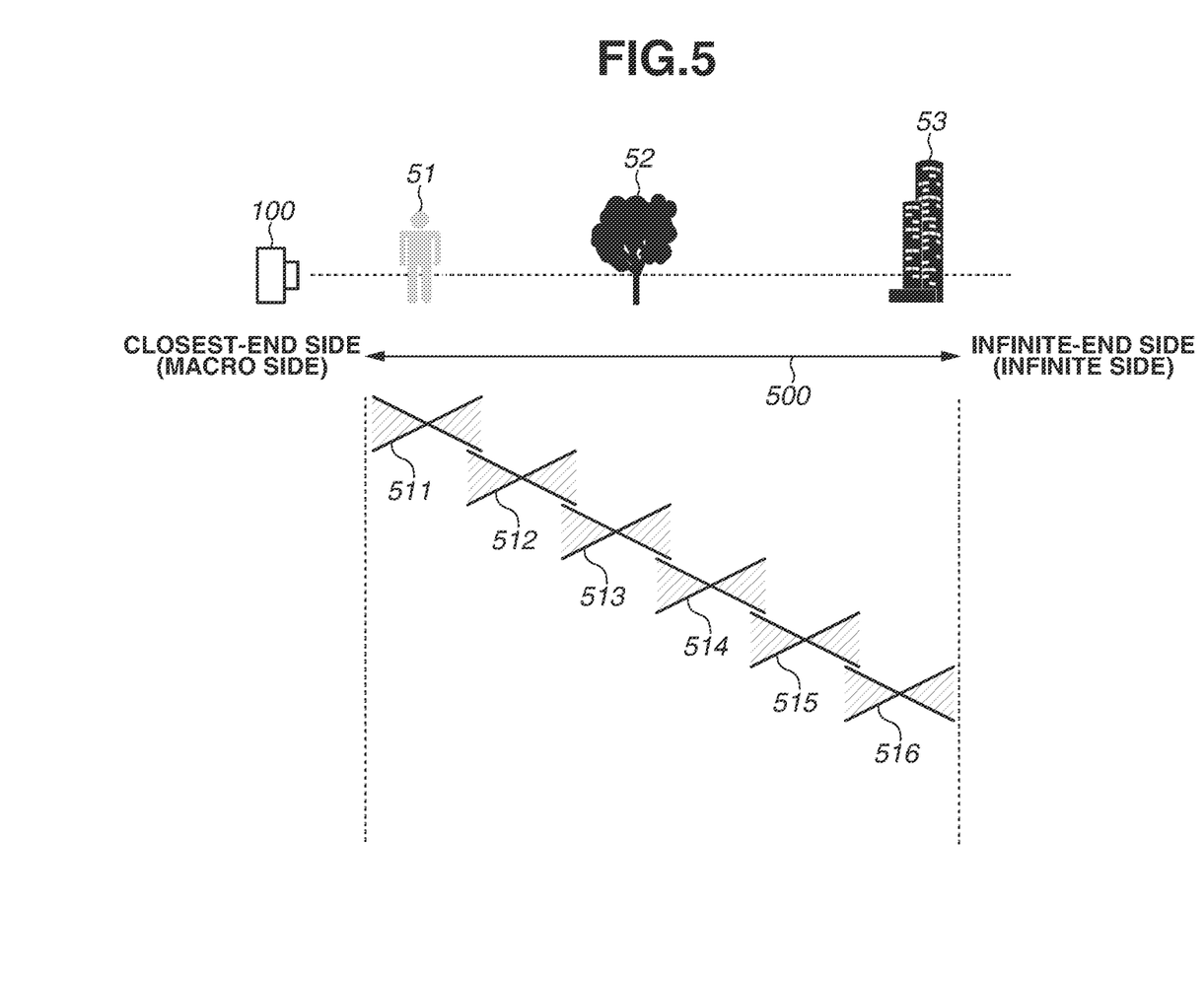
FIG. 5 is a diagram illustrating an example of image pickup for focus stacking according to the exemplary embodiment of the disclosure.

FIG. 5 is a diagram illustrating an example of image pickup for focus stacking according to the present exemplary embodiment. In this example, objects 51 to 53 are assumed as the objects to be focused. The objects 51 to 53 are located in different distances (object distances), and the objects 51, 52, and 53 are located in order from a side close to the digital camera 100 (in direction from short distance side toward long distance side). The objects 51 to 53 cannot be included within the depth of field by image pickup performed once because of the structure of the digital camera 100. Further, to achieve higher resolution, the depth of field of each image is shallowed in some cases. In such a case, to obtain a focus-stacked image focused on all of the plurality of objects 51 to 53, a focal range 500 (bracket range) is covered where focus bracket image pickup is performed, by a plurality of depths of field. Depths of field 511 to 516 indicate depths of field in each image pickup, and are arranged to cover the focal range 500. In other words, when images for in-focus positions with the depths of field 511 to 516 are picked up (six times) at the same angle of view, the objects 51 to 53 within the focal range 500 are focused in any of the images. From the plurality of images picked-up in such a manner, a pixel with the highest sharpness at each position, i.e., a pixel value of the most focused image is selected at each position, and the pixels are synthesized. As a result, the image focused over the entire focal range 500 (entire bracket range) can be obtained.

In the image pickup for focus stacking described above, effective F-numbers when the respective images to be synthesized are picked up are the same. If the effective F-numbers when the respective images to be synthesized are picked up are largely different from one another, the synthesized image may be uneven. More specifically, if the effective F-number is varied to cause difference in brightness of the picked-up image, the brightness of the synthesized image become nonuniform. Further, if the effective F-number is varied to cause difference in depth of the picked-up image, the resolution of the synthesized image become nonuniform.

Further, the lens used in the digital camera is varied in open F-number depending on the in-focus position. In particular, a lens for short-distance image pickup that is frequently used to pick up images for focus stacking is largely different in the effective F-number between the closest end and the infinite end, and the effective F-number is often darker (larger) on the closest end. Accordingly, if the images for focus stacking are picked up under the image pickup condition set at a start of the image pickup while moving a focal position from the closest end side to the infinite end side, brightness of a series of picked-up images is varied with variation of the effective F-number. This may cause nonuniform brightness of the synthesized image. Further, if the depths of the images to be synthesized are different from one another, resolution of the synthesized image may become nonuniform.

Figure 6:
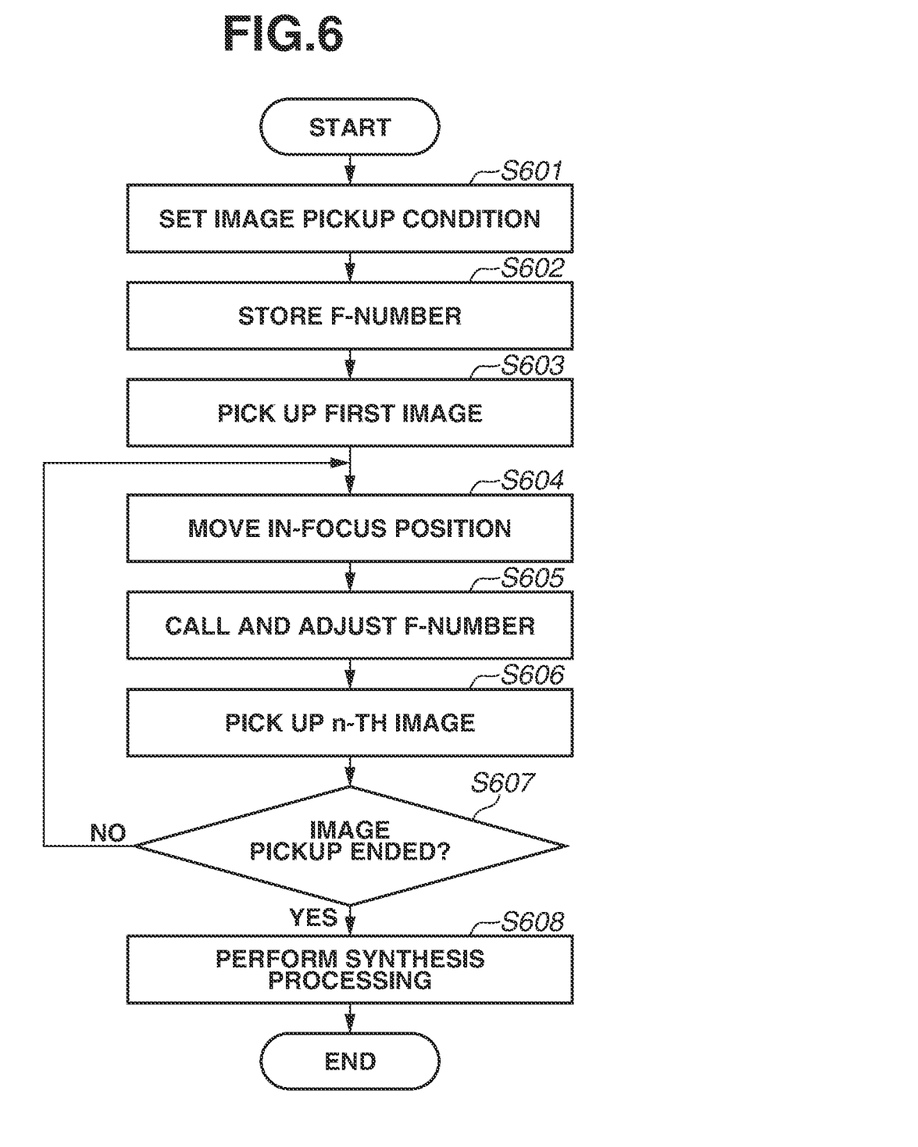
FIG. 6 is a flowchart illustrating the image pickup for focus stacking according to the exemplary embodiment of the disclosure.

In step S601, the system control unit 210 sets the image pickup condition based on input by the user or default setting. The image pickup condition includes the number of images to be picked up and the in-focus position. For example, the user designates a position to be focused through the touch panel doubled as the display unit 101, and designates a plurality of positions to be focused with equal intervals in front of and behind a position to be focused corresponding to the position to be focused in an optical axis direction. Alternatively, the user may designate two positions through the touch panel doubled as the display unit 101, and sets the in-focus positions with equal intervals between the two positions. The system control unit 210 may increase the number of in-focus positions (number of images to be picked up) in consideration of a process load. The system control unit 210 determines an image pickup order of the set in-focus positions in order of distance. For example, the system control unit 210 performs setting so as to change the in-focus position from the closest end side toward the infinite end side.

In step S601, the system control unit 210 further sets the depth of field in image pickup based on the in-focus position, and determines the F-number based on the set depth of field.

In step S601, the system control unit 210 further sets International Organization for Standardization (ISO) sensitivity, a shutter speed in addition to the in-focus position and the depth of field.

In step S602, the system control unit 210 acquires effective F-numbers when images are picked up under the setting in step S601, and stores the effective F-number in the memory 209 for calling it in step S605.

In step S603, the image pickup unit 204 picks up a first image under the setting in step S601.

In step S604, the system control unit 210 changes the in-focus position based on the image pickup order set in step S601.

In step S605, the system control unit 210 calls the F-number stored in step S602, and adjusts the effective F-number for image pickup in step S606 so as to be equal to the F-number stored in step S602. As describe above, in the case where the images are picked up while moving the in-focus position, the effective F-number is varied depending on the in-focus position. Adjusting the effective F-number of the image pickup while moving the in-focus position so as to be coincident with the F-number when the first image is picked up makes it possible to prevent nonuniformity of the synthesized image.

Figure 7:
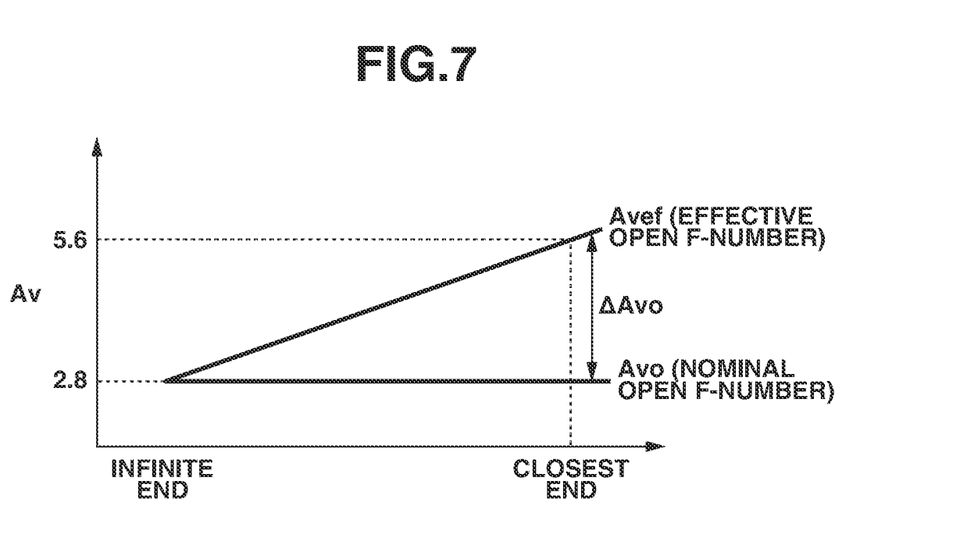
FIG. 7 is a graph illustrating a relationship between an in-focus position and an effective F-number according to the exemplary embodiment of the disclosure.

FIG. 7 is a graph illustrating relationship between the in-focus position and the effective F-number according to the present exemplary embodiment. FIG. 7 illustrates variation of the effective F-number in a case where the in-focus position is moved from the infinite end side to the closest end side while the aperture of the lens is opened at the maximum. Such variation of the effective F-number is previously acquired as lens information, and is used in the adjustment of the F-number in step S605. For example, when the image is picked up while the aperture is set to F2.8 as an open value, the effective F-number at the closest end is F5.6, and the effective F-number at the infinite end is F2.8. In other words, when the image is picked up at the closest end side while the aperture value is set to the open value, and the in-focus position is moved to the infinite end side, the effective F-number is reduced as the in-focus position is moved toward the infinite end side. The system control unit 210 estimates the effective F-number from the previously-acquired relationship between the in-focus position and the effective F-number as illustrated in FIG. 7, and adjusts the aperture so that the effective F-numbers when images other than the first image are picked up become equal to the effective F-number of the first image.

In a case where the system control unit 210 cannot acquire the information relating to the effective F-number from the lens, the image pickup unit 204 performs provisional image pickup before the effective F-number is adjusted in step S605. The system control unit 210 compares brightness of an image obtained by the provisional image pickup and brightness of an image picked up before the provisional image pickup, to estimate variation of the effective F-number. Further, the system control unit 210 calculates a target effective F-number based on a result of the estimation, and closes the aperture.

At this time, the display unit 101 may display the effective F-number. Alternatively, when the effective F-number and a nominal F-number are different from each other, the display unit 101 displays a warning.

In step S606, the image pickup unit 204 picks up an image under the setting adjusted in step S605.

In step S607, the system control unit 210 determines whether to end the image pickup. In a case where it is determined to end the image pickup (YES in step S607), the processing proceeds to step S608, and the synthesis processing is performed. In a case where it is determined not to end the image pickup (NO in step S607), the processing returns to step S604, the in-focus position is moved, and an image of next frame is picked up.

In step S608, the system control unit 210 performs focus stacking processing.

An example of a focus stacking method is described. The system control unit 210 first calculates a positional shift amount of the two images to be synthesized. An example of a method of calculating the positional shift amount is as follows. The system control unit 210 first sets a plurality of blocks in one of the images. In one embodiment, the system control unit 210 sets the plurality of blocks with the same size. Next, the system control unit 210 sets, in the other image, a range wider than each of the set blocks at the same position of each of the set blocks, as a search range. Finally, the system control unit 210 calculates, in each of the search ranges of the other image, a correspondence point at which a sum of absolute difference (hereinafter, referred to as SAD) of the luminance with the corresponding first-set block becomes minimum. The system control unit 210 calculates a positional shift as a vector from a center of each of the first-set blocks and the above-described correspondence point of the corresponding search range. The system control unit 210 may use a sum of squared difference (hereinafter, referred to as SSD), normalized cross correlation (hereinafter, referred to as NCC), etc., in addition to SAD in calculation of the correspondence point described above.

Next, the system control unit 210 calculates transformation coefficients based on the positional shift amount. The system control unit 210 uses, for example, projective transformation coefficients as the transformation coefficients. The transformation coefficients are not limited only to the projective transformation coefficients, and affine transformation coefficients or transformation coefficient simplified only for horizontal or perpendicular shift may be used.

For example, the system control unit 210 may perform transformation with use of an expression (4), $$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix}, \quad (4)$$

where (x', y') represents a coordinate after transformation, and (x, y) represents a coordinate before transformation.

Next, the image processing unit 206 calculates a contrast value of each of the images after alignment. As an example of a method of calculating the contrast value, the image processing unit 206 first uses the following expression (5) to calculate a luminance Y from color signals Sr, Sg, and Sb of each of pixels, $$Y=0.299Sr+0.587Sg+0.114Sb. \quad (5)$$

Next, as described in the following expressions (6) to (8), a Sobel filter is applied to a 3×3 matrix L of the luminance Y of the pixel to calculate a contrast value I, $$I_h = \begin{pmatrix} -1 & 0 & 1 \\ -2 & 0 & 2 \\ -1 & 0 & 1 \end{pmatrix} \cdot L, \quad (6)$$

$$I_v = \begin{pmatrix} -1 & -2 & -1 \\ 0 & 0 & 0 \\ 1 & 2 & 1 \end{pmatrix} \cdot L, \quad (7)$$

$$I = \sqrt{I_h^2 + I_v^2}. \quad (8)$$

The above-described method of calculating the contrast value is just an example. For example, an edge detection filter such as a Laplacian filter or a band-pass filter allowing to pass a predetermined band may be used.

Next, the image processing unit 206 generates a synthetic map. To generate the synthetic map, the image processing unit 206 compares contrast values of the pixels at the same position among the images, and sets a synthetic ratio at the pixel with the highest contrast value to 100% and sets the synthetic ratio at the other pixels at the same position to 0%. The image processing unit 206 sets such a synthetic ratio at all positions in the images.

Finally, the image processing unit 206 replaces the pixels based on the synthetic map, to generate the synthesized image. When the synthetic ratio between adjacent pixels is changed from 0% to 100% (or 100% to 0%) with respect to the synthetic ratio calculated in such a manner, unnaturalness is noticeable at a boundary of the synthesis. Accordingly, a filter having a predetermined number of pixels (tap number) is applied to the synthetic map to prevent drastic change of the synthetic ratio between the adjacent pixels.

Although the example in which the images are picked up while moving the in-focus position from the closest end to the infinite end has been described in the above-described exemplary embodiment, a part of the in-focus positions may be sufficient depending on the object. For example, when an image focused on the closest end is unnecessary, the maximum value of the effective F-number can be reduced as compared with the case where the in-focus position on the closest end is used. Therefore, the area for focus stacking is previously calculated before the series of image pickups are started, the maximum effective F-number in the area for focus stacking is calculated, and the effective F-number is used as a target effective F-number at each of the in-focus positions.

Further, in the case where the images are picked up while moving the in-focus position from the infinite end side to the closest end side, an opening diameter of the aperture is stepwisely increased in order to maintain the effective F-number; however, the aperture may reach the open end on the way. At this time, the image becomes darker as the in-focus position is moved to the closest end; however, the opening diameter of the aperture cannot be increased any more.

In such a case, the system control unit 210 corrects difference of brightness due to difference of the effective F-number by adjusting the ISO sensitivity as a gain and the shutter speed as an exposure time. At this time, nonuniformity of the resolution may remain but nonuniformity of the brightness can be reduced. In addition, the shutter speed is changed in preference to the ISO sensitivity because change of the ISO sensitivity varies a noise amount.

Further, in the above-described exemplary embodiment, the example in which the aperture is first adjusted in order to reduce nonuniformity caused by the effective F-number has been described; however, it is not limited thereto. One or both of the ISO sensitivity and the shutter speed may be changed based on the in-focus position without changing the aperture. In this case, nonuniformity of the resolution may occur among the images; however, at least nonuniformity of the brightness among the images can be reduced. In other words, it is only necessary to adjust at least any of the parameters relating to the image pickup so as to correct influence on the image caused by variation of the effective F-number depending on the in-focus position.

As described above, according to the present exemplary embodiment, the image pickup apparatus such as a digital camera can reduce nonuniformity of the focus-stacked image.

In the above-described exemplary embodiment, the processing from the image pickup processing to the synthesis processing is performed in the same apparatus; however, it is not limited thereto. For example, the image pickup processing may be executed by the image pickup apparatus, and the synthesis processing may be executed by another processing apparatus such as a personal computer (PC) and a server.

Other Embodiments

The exemplary embodiment has been described based on implementation by the digital camera; however, implementation is not limited to implementation by the digital camera. For example, the exemplary embodiment may be implemented by a mobile device that includes an image pickup device, or by a network camera that can pick up an image.

The exemplary embodiment of the disclosure can also be achieved by supplying programs implementing one or more functions of the above-described exemplary embodiment to a system or an apparatus through a network or a storage medium and causing one or more processors of a computer in the system or the apparatus to read and perform the programs. Further, the exemplary embodiment of the disclosure can be achieved by a circuit (e.g., application specific integrated circuit (ASIC)) achieving one or more functions.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus, comprising:
   a sensor configured to pick up a plurality of images different in in-focus position in an optical axis direction via lenses;
   at least one memory configured to store instructions; and
   at least one processor in communication with the at least one memory and configured to execute the instructions to:
   adjust a parameter relating to image pickup so that an effective F-number of a first image and effective F-numbers of a plurality of images different in in-focus position to be picked up after the first image become equal; and
   synthesize the plurality of images,
   wherein the effective F-number is a parameter corresponding to brightness of a picked-up image and varies when the in-focus position is moved from an infinite end side to a closest end side while an aperture of the lens is opened at maximum.

2. The apparatus according to claim 1, wherein the at least one processor further executes instructions to adjust an aperture to make the effective F-number equal when the at least a part of the images is picked up.

3. The apparatus according to claim 1, wherein the at least one processor further executes instructions to adjust at least any one of an exposure time and a gain to correct influence on brightness caused by the effective F-number varied depending on the relative positions of the lenses.

4. The apparatus according to claim 1, wherein the at least one processor further executes instructions to adjust at least any one of an exposure time and a gain to correct influence on brightness caused by the effective F-number varied depending on relative positions of the lenses in a case where an aperture is not adjustable to make the effective F-number equal.

5. The apparatus according to claim 4, wherein the at least one processor further executes instructions to adjust the exposure time in preference to the gain.

6. The apparatus according to claim 1, wherein the plurality of images is overlapped in at least a part of angle of view.

7. The apparatus according to claim 1,
   wherein the at least one processor further executes instructions to generate a synthesized image with use of the plurality of images, and
   wherein a depth of field of the synthesized image is greater than a depth of field of each of the plurality of images.

8. The apparatus according to claim 1, wherein intervals of the in-focus positions of at least a part of the plurality of images are equal to each other.

9. The apparatus according to claim 1, wherein depths of field of at least a part of the plurality of images are equal to each other.

10. The apparatus according to claim 1, wherein the sensor picks up the plurality of images while the in-focus position is moved from a closest end side to an infinite end side.

11. The apparatus according to claim 1, further comprising a display configured to display the effective F-number.

12. The apparatus according to claim 1, wherein the at least one processor further executes instructions to issue warning in a case where the effective F-number when the sensor picks up the image is different from a nominal F-number.

13. The apparatus according to claim 1, wherein the at least one processor further executes instructions to adjust the parameter relating to image pickup based on variation estimated.

14. A method, comprising:
   picking up a plurality of images different in in-focus position in an optical axis direction via lenses;
   adjusting a parameter relating so that an effective F-number of a first image and effective F-numbers of a plurality of images different in in-focus position to be picked up after the first image become equal; and
   synthesizing the plurality of images,
   wherein the effective F-number is a parameter corresponding to brightness of a picked-up image and varies when the in-focus position is moved from an infinite end side to a closest end side while an aperture of the lens is opened at maximum.

15. A non-transitory computer-readable storage medium which stores a program for causing a computer of an image pickup apparatus to execute a method, the method comprising:
   picking up a plurality of images different in in-focus position in an optical axis direction via lenses;
   adjusting a parameter relating to image pickup so that an effective F- number of a first image and effective F-numbers of a plurality of images different in in-focus position to be picked up after the first image become equal; and
   synthesizing the plurality of images,
   wherein the effective F-number is a parameter corresponding to brightness of a picked-up image and varies when the in-focus position is moved from an infinite end side to a closest end side while an aperture of the lens is opened at maximum.

* * * * *